Patented Dec. 28, 1943

2,338,062

UNITED STATES PATENT OFFICE 2,338,062

THERAPEUTIC PREPARATION COMPRISING METAL AND METALOID COMPOUNDS OF THIAMIN

Simon L. Ruskin, New York, N. Y.

No Drawing. Application April 2, 1938, Serial No. 199,712

20 Claims. (Cl. 167—70)

This invention relates to new and improved chemical agents or compounds for the treatment of diseases involving the nervous system, such as those caused by the protozoal spirillae: the spirochete of syphilis and the trypanosome of sleeping sickness, as well as those neuritic conditions caused by vitamine deficiency. More particularly this invention relates to the production and chemotherapeutic use of certain metal and metalloid salts of thiamin, which is believed to be a pyrimidine thiazole compound having the structural formula:

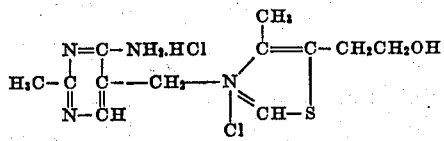

One of the objects of the invention is to provide bismuth, antimony and arsenic compounds particularly efficacious in those diseases which involve the nerves and nervous system, and particularly those accompanying syphilis, sleeping sickness and vitamine $B_1$ deficiency.

It has been a common experience to find that present bismuth, antimony and arsenic compounds cause nervous system disturbances and sometimes neuritis. It is the general object of the present invention to provide compounds which far from having an adverse effect on the nervous system actually have a very decided beneficial effect toward promoting cures in neurosyphilis and sleeping sickness, and which may yet be used in neuritic conditions which are avitamosal in character and not protozoal. I have found that these compounds also have the property of inhibiting involvement of the nervous system by syphilitic and trypanosomal parasites, and that the presence of thiamin makes the bismuth, antimony and arsenic more effective in its action on the offending organism.

Accordingly, my invention comprises the production and therapeutic use of the, preferably, water soluble iodo-metal and metalloid salts of thiamin, of the group comprising bismuth, antimony and arsenic, which can be obtained by reacting the iodides of these elements with the hydrochloride of thiamin, as more fully described below.

To illustrate the nature of my invention, I give the following examples without limiting myself to the precise technique of their preparation:

Example #1

*Preparation of iodo-bismuth thiamin chloride hydrochloride (vitamin $B_1$)*

1 g. (1/300 mole) of thiamin chloride hydrochloride (vitamin $B_1$) was slowly dropped under stirring into 200 c. c. aqueous solution containing 5 g. $BiI_3$ (1/150 mole) and 50 g. KI. A brick red precipitate was formed which was separated by centrifugation and washed three times with distilled water by centrifugation. The moist precipitate was suspended in 250 c. c. of 50% glycerol and brought into solution by treating with 80 c. c. N. NaOH added slowly under stirring. The solution was then brought to a pH of 7 with approximately 6 g. citric acid. It was then filtered to remove any precipitate and the filtrate made up to 400 c. c.

1/150 mole Bi=1400 mg.
1400/400=3.5 mg. Bi per c. c.

The solution can, if desired, be made considerably more concentrated. Also, less NaOH may be used for dissolving the precipitate.

Example #2

*Preparation of iodo-antimony thiamin chloride hydrochloride (vitamin $B_1$)*

1 g. thiamin chloride hydrochlorid (vitamin $B_1$) (1/300 mole) was slowly dropped under stirring into a solution consisting of 3.5 g. $SbI_3$ (2/300 mole), 35 g. KI and 150 cc. water. The precipitate so obtained was separated by centrifugation and washed three times with distilled water by centrifugation. The moist washed precipitate was suspended in 35 cc. 50% glycerol and brought into solution by the slow addition under stirring of 8 cc. 5 N. NaOH. The resulting alkaline solution was brought to a pH of 7.0 with citric acid, filtered, and made up to a volume of 55 cc. Each cc. contains 15 mg. of antimony.

Example #3

*Preparation of iodo-arsenic thiamin chloride hydrochloride (vitamin $B_1$)*

1 g. thiamin chloride hydrochloride (vitamin $B_1$) (1/300 mole) was slowly dropped under stirring into a solution consisting of 3.1 g. $AsI_3$ (2/300 mole) 31 g. KI and 150 cc. water. The resulting precipitate was separated and washed three times with distilled water by centrifugation. The moist washed precipitate was suspended in 35 cc. of 50% glycerol and brought into solution by the slow addition under stirring of 8 cc., 5 N. NaOH. The resulting alkaline solution was brought to a pH of 7.0 by the addition of citric acid, filtered, and made up to 50 cc. Each cc. contains 10 mg. of arsenic.

In preparing the above products, it is desirable to conduct the process in an inert atmosphere, such as nitrogen or carbon dioxide.

What I claim is:

1. A therapeutic preparation comprising an injectible suspension of a complex of thiamin and an iodide of a member of the group consisting of bismuth, antimony and arsenic.

2. A therapeutic preparation comprising an injectible suspension of a complex of thiamin and bismuth iodide.

3. A therapeutic preparation comprising an injectible suspension of a complex of thiamin and antimony iodide.

4. A therapeutic preparation comprising an injectible suspension of a complex of thiamin and arsenic iodide.

5. The method of preparing new therapeutic agents which comprises reacting an iodide of the group consisting of bismuth, antimony and arsenic, with thiamin chloride hydrochloride in a water solution containing an alkali metal iodide, isolating the reaction product, dissolving the same in an alkaline medium, and adjusting the solution to a pH suitable for injection.

6. The method of preparing a therapeutic agent containing bismuth, which comprises reacting bismuth iodide with thiamin chloride hydrochloride in a water solution containing potassium iodide, isolating the reaction product, dissolving the same in a alkaline medium and adjusting the solution to a pH suitable for injection.

7. The method of preparing a therapeutic agent containing antimony, which comprises reacting antimony iodide with thiamin chloride hydrochloride in a water solution containing potassium iodide, isolating the reaction product, dissolving the same in an alkaline medium and adjusting the solution to a pH suitable for injection.

8. The method of preparing a therapeutic agent containing arsenic, which comprises reacting arsenic iodide with thiamin chloride hydrochloride in a water solution containing potassium iodide, isolating the reaction product, dissolving the same in an alkaline medium and adjusting the solution to a pH suitable for injection.

9. The method of preparing new therapeutic agents which comprises reacting an iodide of the group consisting of bismuth, antimony and arsenic, with thiamin chloride hydrochloride in a water solution containing potassium iodide, recovering the resulting precipitate from the solution, dissolving said precipitate in alkalized glycerol, adjusting said solution with a non-poisonous acid to pH 7.0, and filtering the solution from the resulting precipitate.

10. The method of preparing new therapeutic agents which comprises reacting an iodide of the group consisting of bismuth, antimony and arsenic with thiamin chloride hydrochloride in water solution containing potassium iodide, recovering the resulting precipitate, suspending said precipitate in glycerol and bringing the same into solution with an alkali, adding citric acid to bring the pH to 7.0, and filtering the solution from the resulting precipitate.

11. The method of preparing a solution of an iodo-bismuth compound of thiamin which comprises reacting bismuth iodide with thiamin chloride hydrochloride in a water solution containing potassium iodide, recovering the resulting precipitate from the solution, dissolving said precipitate in alkalized glycerol, adjusting said solution with a non-poisonous acid to pH 7.0, and filtering the solution from the resulting precipitate.

12. The method of preparing a solution of an iodo-bismuth compound of thiamin which comprises reacting bismuth iodide with thiamin chloride hydrochloride in water solution containing potassium iodide, recovering the resulting precipitate, suspending the precipitate in glycerol and bringing the same into solution with sodium hydroxide, adding citric acid to bring the pH to 7.0, and filtering the solution from the resulting precipitate.

13. The method of preparing a solution of an iodo-antimony compound of thiamin which comprises reacting antimony iodide with thiamin chloride hydrochloride in a water solution containing potassium iodide, recovering the resulting precipitate from the solution, dissolving said precipitate in alkalized glycerol, adjustng said solution with a non-poisonous acid to pH 7.0, and filtering the solution from the resulting precipitate.

14. The method of preparing a solution of an iodo-antimony compound of thiamin which comprises reacting antimony iodide with thiamin chloride hydrochloride in water solution containing potassium iodide, recovering the resulting precipitate, suspending the precipitate in glycerol and bringing the same into solution with sodium hydroxide, adding citric acid to bring the pH to 7.0, and filtering the solution from the resulting precipitate.

15. The method of preparing a solution of an iodo-arsenic compound of thiamin which comprises reacting arsenic iodide with thiamin chloride hydrochloride in a water solution containing potassium iodide, recovering the resulting precipitate from the solution, dissolving said precipitate in alkalized glycerol, adjusting said solution with a non-poisonous acid to pH 7.0, and filtering the solution from the resulting precipitate.

16. The method of preparing a solution of an iodo-arsenic compound of thiamin which comprises reacting arsenic iodide with thiamin chloride hydrochloride in water solution containing potassium iodide, recovering the resulting precipitate, suspending the precipitate in glycerol and bringing the same into solution with sodium hydroxide, adding citric acid to bring the pH to 7.0, and filtering the solution from the resulting precipitate.

17. A therapeutic preparation comprising a solution of the reaction product of an alkali metal hydroxide and a complex of thiamin and an iodide of a member of the group consisting of bismuth, antimony and arsenic.

18. A therapeutic preparation comprising the substantially neutral solution of an alkali metal compound of a complex of thiamin and an iodide of a member of the group consisting of bismuth, antimony and arsenic.

19. A therapeutic preparation comprising substantially neutral solution of the product of the treatment of a complex of thiamin and an iodide of a member of the group consisting of bismuth, antimony and arsenic, with an alkaline solution, and containing an alkali metal salt of a non-poisonous organic acid.

20. A therapeutic preparation comprising substantially neutral solution of the product of the treatment of a complex of thiamin and an iodide of a member of the group consisting of bismuth, antimony and arsenic, with an alkaline solution, and containing an alkali metal salt of citric acid.

SIMON L. RUSKIN.